(12) United States Patent
Germek et al.

(10) Patent No.: US 12,705,350 B2
(45) Date of Patent: Aug. 11, 2026

(54) SOFTWARE SECURITY CHECKING DEVICE

(71) Applicant: Robert Bosch GmbH, Stuttgart (DE)

(72) Inventors: Dominik Germek, Berlin (DE); Maria Irina Nicolae, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 19 days.

(21) Appl. No.: 18/884,771

(22) Filed: Sep. 13, 2024

(65) Prior Publication Data

US 2025/0103712 A1 Mar. 27, 2025

(30) Foreign Application Priority Data

Sep. 21, 2023 (DE) ......................... 102023209242.5

(51) Int. Cl.
*G06F 21/56* (2013.01)

(52) U.S. Cl.
CPC ........ *G06F 21/56* (2013.01); *G06F 2221/033* (2013.01)

(58) Field of Classification Search
CPC ........................... G06F 21/56; G06F 2221/033
See application file for complete search history.

(56) References Cited

U.S. PATENT DOCUMENTS

| | | | | |
|---|---|---|---|---|
| 10,037,432 | B2 * | 7/2018 | Wibran | G06F 21/6209 |
| 2005/0283751 | A1 * | 12/2005 | Bassin | G06Q 10/04 717/100 |
| 2009/0089751 | A1 * | 4/2009 | Raikes | G06F 9/453 717/120 |
| 2016/0070914 | A1 * | 3/2016 | Baentsch | G06F 21/575 713/2 |
| 2016/0306976 | A1 * | 10/2016 | Gantman | G06F 21/44 |
| 2019/0140314 | A1 * | 5/2019 | Utsuno | C01B 25/14 |
| 2019/0272705 | A1 * | 9/2019 | Ruiz | G06F 21/602 |
| 2020/0065480 | A1 * | 2/2020 | Gu | G06F 21/64 |
| 2020/0311260 | A1 * | 10/2020 | Klonowski | G06F 9/45558 |
| 2025/0005133 | A1 * | 1/2025 | Goodman | G06F 21/575 |

* cited by examiner

*Primary Examiner* — Frantz B Jean
(74) *Attorney, Agent, or Firm* — NORTON ROSE FULBRIGHT US LLP

(57) ABSTRACT

A software security checking device. The device includes: a rule database with rules, each associated with at least one of a plurality of software types and contains a criterion in terms of software feature(s), the rule stating that a piece of software that fulfills the criterion is malicious; an input interface configured to receive a specification of a piece of software; processor(s) configured to ascertain one or more software types of the plurality of software types that the software possesses, to ascertain which of the software features the software possesses, ascertain, for each of the rules associated with at least one of the one or more ascertained software types, whether the criterion that the rule contains is fulfilled, and determine that the software is malicious in response to it being ascertained, for at least one rule, that the criterion it contains is fulfilled.

7 Claims, 2 Drawing Sheets

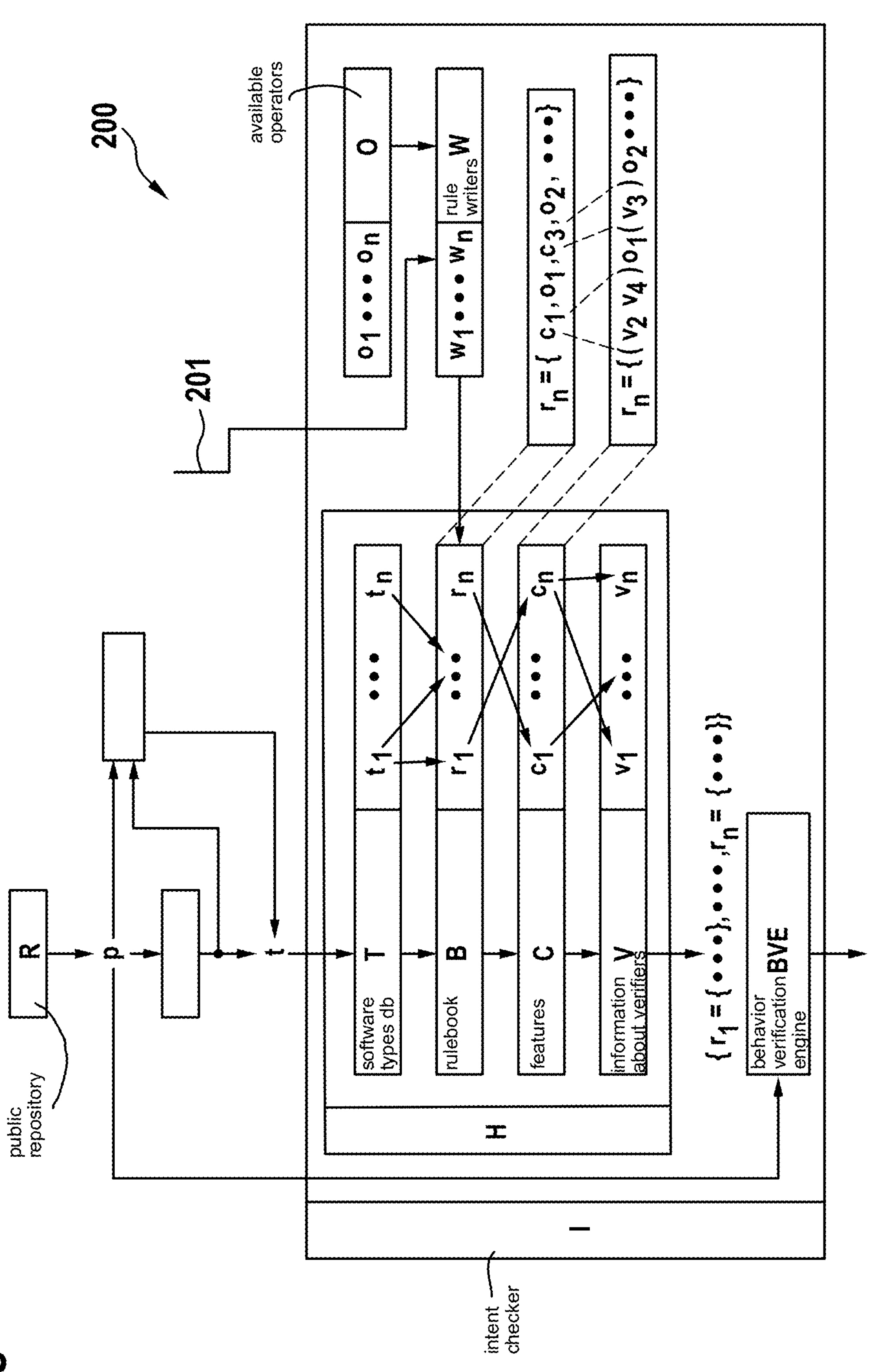
Fig. 2
200
201
public repository
R
p
t
available operators
O
$o_1 \bullet\bullet\bullet o_n$
W
rule writers
$w_1 \bullet\bullet\bullet w_n$
$r_n = \{ c_1, o_1, c_3, o_2, \bullet\bullet\bullet \}$
$r_n = \{ (v_2\ v_4)\ o_1\ (v_3)\ o_2 \bullet\bullet\bullet \}$
T
software types db
$t_1 \bullet\bullet\bullet t_n$
B
rulebook
$r_1 \bullet\bullet\bullet r_n$
C
features
$c_1 \bullet\bullet\bullet c_n$
V
information about verifiers
$v_1 \bullet\bullet\bullet v_n$
H
$\{ r_1 = \{ \bullet\bullet\bullet \}, \bullet\bullet\bullet, r_n = \{ \bullet\bullet\bullet \} \}$
BVE
behavior verification engine
I
intent checker

SOFTWARE SECURITY CHECKING DEVICE

FIELD

The present invention relates to software security checking devices.

BACKGROUND INFORMATION

For many software applications, third-party software packages are used instead of writing all the program components oneself. An example of these are open-source software packages, which can be downloaded from various registries and integrated into one's own software application. However, this requires a more thorough check of the software, since third-party software can potentially be malicious. Therefore, effective approaches to avoiding the use of software that contains a malicious program component are desirable.

SUMMARY

According to various embodiments of the present invention, a software security checking device is provided, comprising a rule database with a plurality of rules, wherein each rule is associated with at least one of a plurality of software types and contains a criterion in terms of one or more software features, wherein the rule states that a piece of software that fulfills the criterion is malicious; an input interface configured to receive a specification of a piece of software; one or more processors that are configured to.

- ascertain one or more software types from the plurality of software types that the software possesses;
- ascertain which of the software features the software possesses;
- ascertain, for each of the rules associated with at least one of the one or more ascertained software types, whether the criterion that the rule contains is fulfilled, on the basis of which software features the software has been ascertained to possess; and
- determine that the software is malicious in response to it being ascertained, for at least one rule, that the criterion it contains is fulfilled; and an output interface that is configured to block use of the software by a data processing device if the software has been determined to be malicious by the one or more processors.

The software security checking device described above allows for the detection of maliciousness of a piece of software (e.g., an unknown software package) and ensures, for example, that a piece of software is only released for use if it is not malicious. The use of malicious software can thus be avoided.

Various exemplary embodiments are specified below.

Exemplary embodiment 1 is a software security checking device as described above.

Exemplary embodiment 2 is a software security checking device according to exemplary embodiment 1, wherein for at least some of the rules (possibly all), the criterion is a Boolean function of the one or more software features.

This allows for efficient modeling of and checking for maliciousness.

Exemplary embodiment 3 is a software security checking device according to exemplary embodiment 1 or 2, wherein at least some of the rules are fuzzy logic rules.

This allows rules to be defined more flexibly in order to detect malicious software.

Exemplary embodiment 4 is a software security checking device according to one of exemplary embodiments 1 to 3, comprising a user interface for defining at least part of the rules of the rule database.

This allows software to be automatically checked for maliciousness on the basis of rules defined by human users.

Exemplary embodiment 5 is a software security checking device according to one of exemplary embodiments 1 to 4, wherein the data processing device is a control device, and the software is at least part of a control program (e.g., for a robot device).

In this way, for example, the security of a robot control system can be ensured.

Exemplary embodiment 6 is a method for checking the security of software, comprising storing a plurality of rules, wherein each rule is associated with at least one of a plurality of software types and contains a criterion in terms of one or more software features, wherein the rule states that a piece of software that fulfills the criterion is malicious; receiving a specification (e.g., source code) of a piece of software; ascertaining one or more software types of the plurality of software types that the software possesses; ascertaining which of the software features the software possesses; ascertaining, for each of the rules associated with at least one of the one or more ascertained software types, whether the criterion that the rule contains is fulfilled, on the basis of which software features the software has been ascertained to possess; determining that the software is malicious in response to it being ascertained, for at least one rule, that the criterion it contains is fulfilled; and blocking the use of the software by a data processing device, if (i.e., e.g., in response to the fact that) the software has been determined to be malicious.

Exemplary embodiment 7 is a computer program comprising commands which, when executed by a processor, cause the processor to carry out a method according to exemplary embodiment 6.

Exemplary embodiment 8 is a computer-readable medium storing commands which, when executed by a processor, cause the processor to carry out a method according to exemplary embodiment 6.

It should be noted that the exemplary embodiments described in connection with the software security checking device can be applied analogously to the method for checking the security of software.

In the figures, similar reference signs generally refer to the same parts throughout the various views. The figures are not necessarily true to scale, with emphasis instead generally being placed on the representation of the principles of the present invention. In the following description, various aspects are described with reference to the figures.

BRIEF DESCRIPTION OF THE DRAWINGS

FIG. 2 illustrates the description of the architecture of an automatic intent checker according to an example embodiment of the present invention.

DETAILED DESCRIPTION OF EXAMPLE EMBODIMENTS

Figure 1:
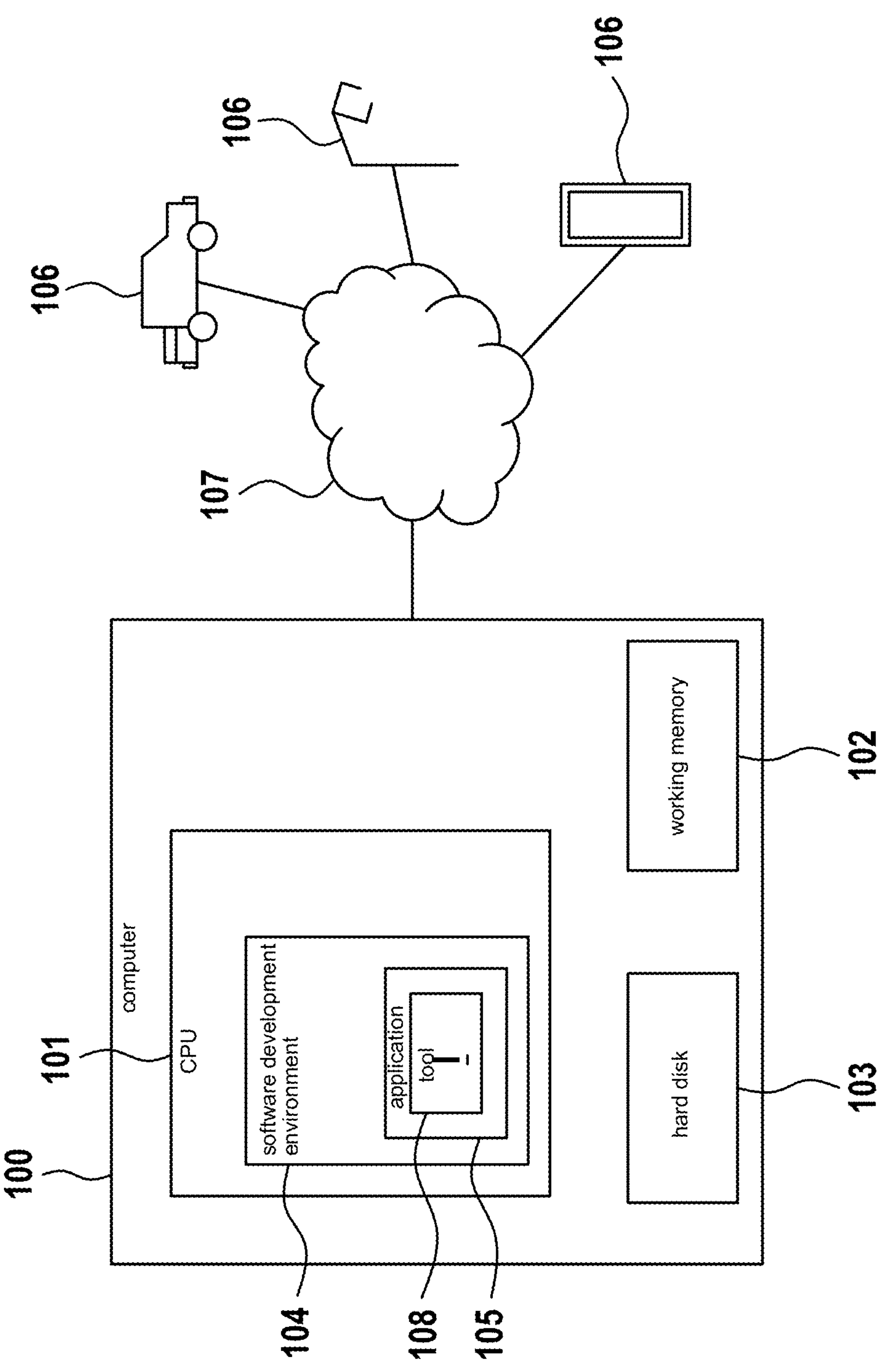
FIG. 1 shows a computer for developing and/or checking software applications, according to an example embodiment of the present invention.

The following detailed description relates to the figures, which show, by way of explanation, specific details and aspects of this disclosure in which the present invention can be executed. Other aspects may be used and structural, logical, and electrical changes may be performed without departing from the scope of protection of the present invention. The various aspects of this disclosure are not necessarily mutually exclusive, since some aspects of this disclosure may be combined with one or more other aspects of this disclosure to form new aspects.

Various examples are described in more detail below.

FIG. 1 shows a computer 100 for developing and/or checking software applications.

The computer 100 comprises a CPU (central processing unit) 101 and a working memory (RAM) 102. The working memory 102 is used for loading program code, e.g., from a hard disk 103, and the CPU 101 executes the program code.

In the present example, it is assumed that a user (developer) intends to develop and/or test a software application using the computer 100.

For this purpose, the user runs a software development environment 104 in the CPU 101.

The software development environment 104 makes it possible for the user to develop and test an application (i.e., software) 105 for different devices 106, i.e., target hardware, such as embedded systems for controlling robot devices, including robot arms and autonomous vehicles, or also for mobile (communication) devices. For this purpose, the CPU 101 can run an emulator as part of the software development environment 104 in order to simulate the behavior of the particular device 106 for which an application is being or has been developed. If it is used only for testing (or checking) a piece of software from another source, the software development environment 104 can also be viewed or designed as a software test environment (and thus the computer 100 in particular as a software security checking device).

The user can distribute the finished application to corresponding devices 106 via a communication network 107. Rather than via a communication network 107, this can also be done in another way, for example by means of a USB stick.

However, before doing so, the user should carry out a check of the application 105, i.e., gain knowledge of whether the application 105 is malicious, in order to avoid distributing a malicious application to the devices 106. This may also be the case if the user has not written the application 105 at least partially himself, but has, e.g., adopted program components from third-party providers, e.g., libraries, in particular from open-source software packages.

Open-source software packages have become an essential cornerstone of modern software development. It is estimated that free and open-source software accounts for 70 to 90% of any modern software solution. Therefore, the availability of software packages shapes almost every aspect of modern software-based solutions, products and services. Numerous packages can be downloaded from one of the many software package registries (also called repositories), including npm (JavaScript), PyPI (Python), RubyGems (Ruby) and others. Distributed across these registries, developers publish tens of thousands of updates and upload hundreds of new packages every day—creating a collection of several million openly available software packages. Unfortunately, this overwhelming availability of free software comes at a price: potentially malicious software. The increased risk is due to a plurality of factors: (1) anyone can upload software packages, (2) only a limited number of packages are digitally signed or checked, and (3) registries typically do not have an active recognition mechanism. This environment is ideal for the integration of manipulated software packages to carry out attacks, e.g., on a supply chain.

There are concepts for recognizing malicious software packages that are based on checking a set of features that could indicate a compromised package, wherein a given piece of software is checked in terms of each feature individually. However, checking only a set of features can be misleading, since many software packages inherently contain desirable features that are critical to their intended real functionality, but may also have malicious software. Therefore, by default, checking all features to create an overall confidence score results in noise and many false positive results that require human analysis, as a result of which the applicability of the automation process is reduced.

According to various embodiments, an approach is provided that makes it possible to model malicious and benign intent of software packages based on rules understandable to humans and to use such rules to verify benign behavior of a software package (i.e., one or more programs that could be part of a larger program, e.g., one or more program components of the application 105) or to detect malicious behavior. For example, the software development environment 104 implements a corresponding tool 108 (which can be considered a security checking tool) that implements the approach described below.

Thus, according to various embodiments, a system is provided for automatically modeling malicious (and benign) intent using descriptive rules that can be used for targeted checking of the behavior (benignity/maliciousness) of a software package.

According to various embodiments, the behavior verification for a software package p is effected on the basis of an automatic intent checker I (e.g., as part of the verification tool 108) that serves to determine whether there are indications of malicious intent of the software package (e.g., which originates from an online package registry). It should be noted that the term "software package" is not limited to software components from online registers. In principle, any snippet of code or any piece of software can be used as input for the extraction.

FIG. 2 illustrates the description of the architecture 200 of an automatic intent checker I according to an embodiment.

The input of the intent checker I is an open-source software package p (e.g., JavaScript) which is, for example, downloaded by the user from a public repository R (e.g., npm). The package p can be stored in a secured and isolated container that is used for the analysis.

The intent checker I contains a behavior extraction chain H. H contains four interconnected databases:

- Features database: This stores features C. The features define a set of individual properties that indicate potentially malicious behavior.
- Verifier database: This contains information about verifiers V; that is, about a collection of tools, methods and systems that make it possible to check, for each of the features C, whether a given software package possesses this feature.
- Rulebook (rule database) B: This contains a set of rules, wherein each rule contains a criterion (e.g., in the form of a relevant Boolean function with the features as input variables). The rules define malicious or benign behavior, with each rule stating either that the software is benign if the criterion of the rule (i.e., the criterion it contains) is fulfilled, or stating that the software is malicious if the criterion of the rule is fulfilled.

Software types database (T): Contains known types of software, wherein each software type is associated with one or more rules from the rulebook.

The rulebook stores a set of rules that define a specific behavior that can be associated with a specific type of software package: benign behavior or malicious behavior. A single rule defines what a human (or any form of inference-generating model) defines as malicious behavior. The set of rules can be extended at any time by the rule writers W. For example, a user can write a new rule if this is necessary and enter it via a user interface, symbolized by the arrow 201 in FIG. 2. A rule writer can be a (human) user, a machine learning-based model or any other process that can create appropriate rules. The rules can be adjusted on the basis of the generated clues in order to better detect the checking of the malicious behavior. Rules contain two main elements: features and operators. A feature describes, e.g., a specific function of a software package, e.g., "connects to an external server," "processes passwords," "stores data" and others. Each feature can be checked (verified) by one or more of the verifiers. It should be noted that the individual features alone are not necessarily indicators of malicious behavior. However, using the logical operators O, rules can be formed that make it possible to model malicious behavior with individual harmless features together. For example, some features (if applicable, in combination) are characteristic of malicious software only for a specific software type.

For example, a math library should most likely not connect to an external server during a calculation. However, for an authentication package communicating with an external service, connecting to an external server may be completely harmless behavior. The approach described therefore makes it possible to translate a description of malicious behavior that is understandable to humans into rules that can be evaluated.

As illustrated in FIG. 2, the intent check for a software package p from a registry R is effected, for example, as follows:

1. If available, one or more software types t of one or more pieces of software contained in the package are ascertained by type extraction 202. This is effected, for example, as follows:
   One or more possible types can be manually extracted from the description available online, keywords, documentation and other content available in the relevant registry (e.g., on the specific package website on npm).
   One or more possible types can be extracted from software packages with the aid of scripts that automatically scan the specified contents of the software packages.
   One or more possible types can be extracted with the aid of a machine learning-based content analysis of software packages.
   The type can be defined manually (by the user) on the basis of assumptions about the functionality (e.g., if the user intends to use a math library, the "math library" type can be set, since the assumption of this type is plausible; users typically know at least roughly what a package is supposed to do before using it).

It should be noted that the type description for a software package should normally only be undertaken once, since subsequent updates to the package should not change the type of the package. Therefore, the types can be stored locally in a local memory $L_{pt}$ and accessed as needed (if the type(s) of the relevant software package is/are already registered in the local memory $L_{pt}$).

A type t is a unique description of the type of software that is contained in the package. This description can be based on a standard software classification and can consist of one or more words, numbers, symbols or other identifiable and readable text structures. Examples of types are "math library," "image rendering library," "crypto library," "machine learning library," "database" and others. The type(s) can also be specified by the user if the user wants to actively describe the type of package.

If the package p has already been processed, the one or more types can be fetched from the local memory $L_{pt}$.

2. On the basis of the type t ascertained for the software package (or the ascertained types in case the software package can have a plurality of types), the intent checker I ascertains a set of verifiers by following the dependencies in the behavior chain (H). The dependencies in H are traversed as follows to ascertain the verifiers:
   (a) Each software type $t_i$ is connected to one or more rules $r_i$ from the rulebook. For example, for $t_1$="math library," the following exemplary rule $r_1$ could be defined to describe malicious behavior for this software type:
   r1="establishes a connection to an external server" OR "reads files outside the project directory" OR "creates files outside the project directory" (b)
   (b) Each rule $r_i$ from the rule book B detects one or more features from C and thus creates a logical connection between the features using the available logical operators from O. For example, the above example $r_i$ comprises three individual features ("establishes a connection to an external server," "reads files outside the project directory" and "creates files outside the project directory"). A single rule can contain any number of features and be of any complexity. O contains the set of available operators, including AND, OR, NOT, conditional expressions, and others.
   (c) Each feature ci is associated with one or more verifiers. Each verifier can check whether or not a specific piece of software has the feature associated with it. To do this, for example, it can execute an analysis script and/or execute the relevant software in isolation.
3. The result of the behavior chain is a set of rules that contains exactly the set of verifiers and operators in order to check the behavior of the input packet p. It should be noted that each step of the behavior chain prepares the rules by replacing the types with rules, the rules with features and logical operators, and the features with verifiers—in that sequence.
4. The final set of rules (with all details) is passed to a behavior verification engine (BVE). This engine executes each verifier in the rule set and generates an indication value. This value can be a Boolean value (true or false), a decimal value, or any other value that can be interpreted to provide a conclusive statement about whether the feature being tested by the verifier is present in the software.

The behavior verification engine (BVE) takes as input the set of rules selected by H on the basis of t (or a plurality of types). The BVE processes each rule from the given set in a plurality of steps:

a) All verifiers referenced in the rule are executed and the results are collected and replaced in the rules. The replaced values must be in a form that can be evaluated (e.g., true and false) using logical operators. True can mean that a verifier has concluded that a specific feature is true for the given software package. It should be noted that the final "true" or "false" can also be generated on the basis of other types of data (e.g., if the returned score is below or above a threshold).

b) Once all test results are collected, the BVE evaluates the Boolean expression, following the standard rules for evaluating Boolean expressions. It should be noted that the rules can be of any complexity and contain nested (bracketed) expressions.

c) The end result of the BVE is a single indication (true or false) about whether the behavior described in the rule applies to the software package.

In the event that the set of logic operators O used by the intent checker I is too rigid for some rules, the system can be extended to support fuzzy logic in order to express more "fuzzy" conditions. In terms of the rules, this would mean including qualifiers for a specific behavior, such as "often," "slow," "moderate," "high." Instead of saying, e.g., that p is malicious if r="connects to external server," we can define r="connects to external server VERY OFTEN." With the aid of fuzzy logic, the approach described here can therefore be adapted to better detect and describe a specific malicious or benign behavior that is specific to each software type. It should be noted that the system would only need to be adapted in relation to the BVE in order to support the evaluation of fuzzy logic—a well-known form of many-valued logic.

5. The final output of the automatic intent check consists of an indication of whether the software package p is evaluated as malicious or benign.

In summary, according to various embodiments, a software security checking device is provided (e.g., in the form of a data processing device such as the data processing device 100 or a component thereof), which comprises:

A rule database having a plurality of rules, wherein each rule is associated with at least one of a plurality of software types and contains a criterion in terms of one or more software features, wherein the rule states that a piece of software that fulfills the criterion is malicious; an input interface configured to receive a specification (e.g., source code) of a piece of software; one or more processors that are configured to.

ascertain one or more software types from the plurality of software types that the software possesses;

ascertain which of the software features the software possesses;

ascertain, for each of the rules associated with at least one of the one or more ascertained software types, whether the criterion that the rule contains is fulfilled, on the basis of which software features the software has been ascertained to possess; and determine that the software is malicious in response to it being ascertained, for at least one rule, that the criterion it contains is fulfilled; and an output interface that is configured to block use of the software by a data processing device (a data processing device other than that implementing the software security checking device or even the same data processing device that implements the software security checking device), if (i.e., e.g., in response to the fact that) the software has been determined to be malicious by the one or more processors.

The software security checking device can be carried out by one or more computers with one or more data processing units. The term "data processing unit" may be understood as any type of entity that allows for processing of data or signals. The data or signals can be treated, for example, according to at least one (i.e., one or more than one) special function which is performed by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA) or any combination thereof. Any other way of implementing the respective functions described in more detail herein may also be understood as a data processing unit or logic circuit assembly. One or more of the method steps described in detail here can be executed (e.g., implemented) by a data processing unit by one or more special functions that are performed by the data processing unit.

According to various embodiments, the provided approach (or software security checking device) has or makes possible the following properties:

1. An improved check of whether software is malicious: Following the dependencies in H, the filtered-out verifiers are specific to the selected type(s) of the input packet p. Compared to an approach with which the recognition of malicious software is effected by checking for features individually and independently, even if they only indicate maliciousness in combination (but can be individually fulfilled by benign software), noise and false positive results (which would require manual verification) can be avoided.
2. The creation of user-defined definitions of malicious (or benign) behavior (as combinations of features) that are understandable to humans.
3. The detection not only of intended malicious behavior, but also of unintended malicious behavior, i.e., "unexpected" and "suspicious" behavior that is not necessarily due to a malicious act, but rather due to an error, forgotten debugging code fragments, and others.
4. The different databases within the behavior chain offer a high degree of adaptability and flexibility in defining new rules. For example, a comprehensive rule can be created by nesting existing rules from the database.
5. The software security checking device can be configured such that the number of registered verifiers, features, rules and types in H increases with each use (as the software security checking device adds them to the respective databases), such that it becomes increasingly efficient over time.
6. Once H is populated with data, the intent checker I can be integrated into an automated development environment (such as the software development environment 104). For example, the analysis can be triggered automatically during testing (e.g., of application 105) and thus provide an indication of maliciousness. The report can then be used as input for various security audits.
7. The software security checking device is applicable to both open-source and closed-source software.
8. The software security checking device can support the analysis of any software code written in any programming language, as long as the verifiers support the target language.
9. The software security checking device can support fuzzy logic in order to make possible a more accurate description of the malicious and benign behavior of software packages.

The software whose security is being checked (or the application that contains the software as a component) can, for example, be a control program or a control program component for a robot device. The term "robot device" may be understood to refer to any technical system (comprising a mechanical part whose movement is controlled and thus has a trajectory), such as a computer-controlled machine, a vehicle, a household appliance, a power tool, a manufacturing machine, a personal assistant or an access control system. The software can also be part of an infotainment system in a vehicle or a software app on a mobile phone that communicates with another device (e.g., robot device such as a vehicle or a robot).

The invention claimed is:

1. A software security checking device, comprising:

a rule database having a plurality of rules, wherein each rule of the plurality of rules is associated with a respective at least one of a plurality of software types selected from a math library, an image rendering library, a crypto library, and a database, and contains a criterion in terms of one or more software features, wherein the rule states that a piece of software that fulfills the criterion is malicious;

an input interface configured to receive a specification of a piece of software;

one or more processors that are configured to:

ascertain one or more software types from the plurality of software types that the software possesses, ascertain which of the software features the software possesses, ascertain, for each of the rules associated with at least one of the one or more ascertained software types, whether the criterion that the rule contains is fulfilled, based on which software features the software has been ascertained to possess; and determine that the software is malicious in response to it being ascertained, for at least one rule of the plurality of rules, that the criterion it contains is fulfilled; and an output interface that is configured to block use of the software by a data processing device if the software has been determined to be malicious by the one or more processors.

2. The software security checking device according to claim 1, wherein for at least some of the rules, the criterion is a Boolean function of the one or more software features.

3. The software security checking device according to claim 1, wherein at least some of the rules are fuzzy logic rules.

4. The software security checking device according to claim 1, further comprising a user interface for defining at least part of the rules of the rule database.

5. The software security checking device according to claim 1, wherein the data processing device is a control device, and the software is at least part of a control program.

6. A method for checking security of software, comprising the following steps:

storing a plurality of rules, wherein each rule of the plurality of rules is associated with a respective at least one of a plurality of software types selected from a math library, an image rendering library, a crypto library, and a database, and contains a criterion in terms of one or more software features, wherein the rule states that a piece of software that fulfills the criterion is malicious;

receiving a specification of a piece of software;

ascertaining one or more software types of the plurality of software types that the software possesses;

ascertaining which of the software features the software possesses;

ascertaining, for each of the rules associated with at least one of the one or more ascertained software types, whether the criterion that the rule contains is fulfilled, based which software features the software has been ascertained to possess;

determining that the software is malicious in response to it being ascertained, for at least one rule, that the criterion it contains is fulfilled; and blocking the use of the software by a data processing device based on it being determined that the software is malicious.

7. A non-transitory computer-readable medium on which are stored instructions for checking security of software, the instructions, when executed by a processor, causing the processor to perform the following steps:

storing a plurality of rules, wherein each rule of the plurality of rules is associated with a respective at least one of a plurality of software types selected from a math library, an image rendering library, a crypto library, and a database, and contains a criterion in terms of one or more software features, wherein the rule states that a piece of software that fulfills the criterion is malicious;

receiving a specification of a piece of software;

ascertaining one or more software types of the plurality of software types that the software possesses;

ascertaining which of the software features the software possesses;

ascertaining, for each of the rules associated with at least one of the one or more ascertained software types, whether the criterion that the rule contains is fulfilled, based which software features the software has been ascertained to possess;

determining that the software is malicious in response to it being ascertained, for at least one rule, that the criterion it contains is fulfilled; and blocking the use of the software by a data processing device based on it being determined that the software is malicious.

* * * * *